US012605632B2

(12) United States Patent　(10) Patent No.:　US 12,605,632 B2
Hu　(45) Date of Patent:　Apr. 21, 2026

(54) METHOD, APPARATUS, COMPUTER DEVICE, AND STORAGE MEDIUM FOR INTERACTION CONTROL

(71) Applicant: Beijing Zitiao Network Technology Co., Ltd., Beijing (CN)

(72) Inventor: Songtao Hu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 293 days.

(21) Appl. No.: 18/463,158

(22) Filed: Sep. 7, 2023

(65) Prior Publication Data

US 2024/0082727 A1　　Mar. 14, 2024

(30) Foreign Application Priority Data

Sep. 8, 2022　(CN) ........................ 202211096326.X

(51) Int. Cl.
*A63F 13/56*　　　(2014.01)
*A63F 13/2145*　　(2014.01)
(Continued)

(52) U.S. Cl.
CPC .......... *A63F 13/56* (2014.09); *A63F 13/2145* (2014.09); *A63F 13/42* (2014.09);
(Continued)

(58) Field of Classification Search
CPC ...... A63F 13/56; A63F 13/2145; A63F 13/42; A63F 13/44; A63F 13/58
See application file for complete search history.

(56) References Cited

U.S. PATENT DOCUMENTS 6,165,073 A * 12/2000 Miyamoto .............. A63F 13/10
463/31
6,409,604 B1 * 6/2002 Matsuno ............... A63F 13/833
463/31
(Continued)

FOREIGN PATENT DOCUMENTS

CN　　111589142 A　　8/2020
CN　　113318434 A　　8/2021
(Continued)

OTHER PUBLICATIONS

China National Intellectual Property Administration, Office Action Issued in Application No. 202211096326.X, Apr. 30, 2025, 22 pages.
(Continued)

*Primary Examiner* — Chase E Leichliter
(74) *Attorney, Agent, or Firm* — Alleman Hall LLP

(57)　　　　ABSTRACT
A method for interaction control comprises displaying a virtual scene and a skill control in a display interface, determining a target position of a second virtual object in the virtual scene in response to a trigger operation of the skill control, and determining, based on a distance between the target position and a first virtual object, a skill release area of the target skill and skill effect information for a third virtual object located within the skill release area. The distance is positively correlated with a size of the release range and negatively correlated with a size of an effect value indicated by the skill effect information. The method includes, in response to a release operation of the skill control, controlling the second virtual object to move to the target position and releasing the target skill based on the skill release area and the skill effect information.

20 Claims, 5 Drawing Sheets

X1　X3　　X3`　T1　T2　X2

(51) Int. Cl.

| | |
|---|---|
| *A63F 13/42* | (2014.01) |
| *A63F 13/44* | (2014.01) |
| *A63F 13/58* | (2014.01) |
| *A63F 13/92* | (2014.01) |
| *G06F 3/0486* | (2013.01) |
| *G06F 3/0488* | (2022.01) |

(52) U.S. Cl.
CPC .............. *A63F 13/44* (2014.09); *A63F 13/58* (2014.09); *A63F 13/92* (2014.09); *G06F 3/0486* (2013.01); *G06F 3/0488* (2013.01)

(56) References Cited

U.S. PATENT DOCUMENTS

| | | | | |
|---|---|---|---|---|
| 9,770,664 | B2 * | 9/2017 | Jo ............................ | A63F 13/30 |
| 10,786,733 | B2 * | 9/2020 | Tang ...................... | A63F 13/70 |
| 2002/0103031 | A1 * | 8/2002 | Neveu ................... | A63F 13/537 |
| | | | | 463/49 |
| 2006/0111182 | A1 * | 5/2006 | Nakanishi ............. | A63F 13/426 |
| | | | | 463/36 |
| 2006/0252531 | A1 * | 11/2006 | Kando .................. | A63F 13/335 |
| | | | | 463/36 |
| 2006/0258443 | A1 * | 11/2006 | Moro .................. | A63F 13/2145 |
| | | | | 463/30 |
| 2008/0026843 | A1 * | 1/2008 | Nakasaka ........... | A63F 13/2145 |
| | | | | 463/37 |
| 2010/0004041 | A1 * | 1/2010 | Shindo .................... | A63F 13/42 |
| | | | | 463/36 |
| 2010/0240429 | A1 * | 9/2010 | Chosogabe ............. | A63F 13/56 |
| | | | | 463/43 |
| 2010/0267435 | A1 * | 10/2010 | Taya ....................... | A63F 13/45 |
| | | | | 463/2 |
| 2010/0267436 | A1 * | 10/2010 | Lee ....................... | A63F 13/833 |
| | | | | 463/8 |
| 2011/0039618 | A1 * | 2/2011 | Ichiyanagi ............ | A63F 13/837 |
| | | | | 463/31 |
| 2012/0178531 | A1 * | 7/2012 | Yamada ................ | A63F 13/537 |
| | | | | 463/33 |
| 2012/0327106 | A1 * | 12/2012 | Won ...................... | A63F 13/843 |
| | | | | 345/173 |
| 2013/0288790 | A1 * | 10/2013 | Wang .................. | A63F 13/2145 |
| | | | | 463/31 |
| 2013/0316813 | A1 * | 11/2013 | Derome ............. | A63F 13/2145 |
| | | | | 463/31 |
| 2013/0316817 | A1 * | 11/2013 | Tanzawa .............. | G06F 3/0481 |
| | | | | 463/31 |
| 2014/0121012 | A1 * | 5/2014 | Tagawa .................. | A63F 13/00 |
| | | | | 463/31 |

| | | | | |
|---|---|---|---|---|
| 2015/0157932 | A1 * | 6/2015 | Kwon ................... | G06Q 50/00 |
| | | | | 463/31 |
| 2015/0273343 | A1 * | 10/2015 | Watabe .................. | A63F 13/00 |
| | | | | 463/31 |
| 2016/0124518 | A1 * | 5/2016 | Takahashi .......... | G06F 3/04817 |
| | | | | 463/31 |
| 2016/0129345 | A1 * | 5/2016 | Seok ..................... | A63F 13/213 |
| | | | | 463/31 |
| 2016/0199728 | A1 * | 7/2016 | Yoon ..................... | G06F 3/0488 |
| | | | | 463/37 |
| 2017/0072311 | A1 * | 3/2017 | Maejima ................ | A63F 13/42 |
| 2017/0340959 | A1 * | 11/2017 | Tang ..................... | G06F 3/0488 |
| 2017/0368462 | A1 * | 12/2017 | Jo ........................... | A63F 13/35 |
| 2018/0024660 | A1 * | 1/2018 | Wang ................. | G06F 3/04817 |
| | | | | 273/110 |
| 2018/0028914 | A1 * | 2/2018 | Yamaguchi ............. | A63F 13/92 |
| 2018/0147488 | A1 * | 5/2018 | Tang ...................... | A63F 13/40 |
| 2018/0185747 | A1 * | 7/2018 | Li ......................... | A63F 13/58 |
| 2018/0200616 | A1 * | 7/2018 | Li ........................ | A63F 13/214 |
| 2021/0138351 | A1 * | 5/2021 | Yu ........................ | A63F 13/533 |
| 2021/0275914 | A1 * | 9/2021 | Wu ...................... | A63F 13/577 |
| 2021/0322864 | A1 * | 10/2021 | Shao ...................... | A63F 13/92 |
| 2021/0339138 | A1 * | 11/2021 | Shao ................. | A63F 13/2145 |
| 2022/0032187 | A1 * | 2/2022 | Hu ...................... | A63F 13/537 |
| 2022/0032191 | A1 * | 2/2022 | Wei ...................... | A63F 13/533 |
| 2022/0040582 | A1 * | 2/2022 | Wan ...................... | A63F 13/58 |
| 2022/0047945 | A1 * | 2/2022 | Wei ...................... | A63F 13/426 |
| 2022/0266139 | A1 * | 8/2022 | Liu ......................... | A63F 13/52 |
| 2023/0040506 | A1 * | 2/2023 | Li ........................... | A63F 13/80 |
| 2023/0173386 | A1 * | 6/2023 | Matsushita ............. | A63F 13/58 |
| | | | | 463/31 |
| 2023/0356080 | A1 * | 11/2023 | Zheng ................... | A63F 13/58 |
| 2024/0033629 | A1 * | 2/2024 | Zheng .................. | A63F 13/533 |
| 2024/0082727 | A1 * | 3/2024 | Hu ........................ | A63F 13/837 |
| 2024/0143145 | A1 * | 5/2024 | Wan ................... | A63F 13/5372 |
| 2024/0207732 | A1 * | 6/2024 | Quan .................... | A63F 13/537 |
| 2024/0245991 | A1 * | 7/2024 | Chen ...................... | A63F 13/55 |
| 2025/0170483 | A1 * | 5/2025 | Liu ........................ | A63F 13/426 |
| 2025/0177866 | A1 * | 6/2025 | Liu ........................ | A63F 13/58 |

FOREIGN PATENT DOCUMENTS

| | | |
|---|---|---|
| CN | 114712859 A | 7/2022 |
| CN | 115006838 A | 9/2022 |

OTHER PUBLICATIONS

"Couple must play game «HAVEN» with detailed and multi-faceted review introduction—thank you, it's so sweet," Bilibili, Available Online at https://b23.tv/MSHWyFn, Oct. 30, 2020, 3 pages.

* cited by examiner

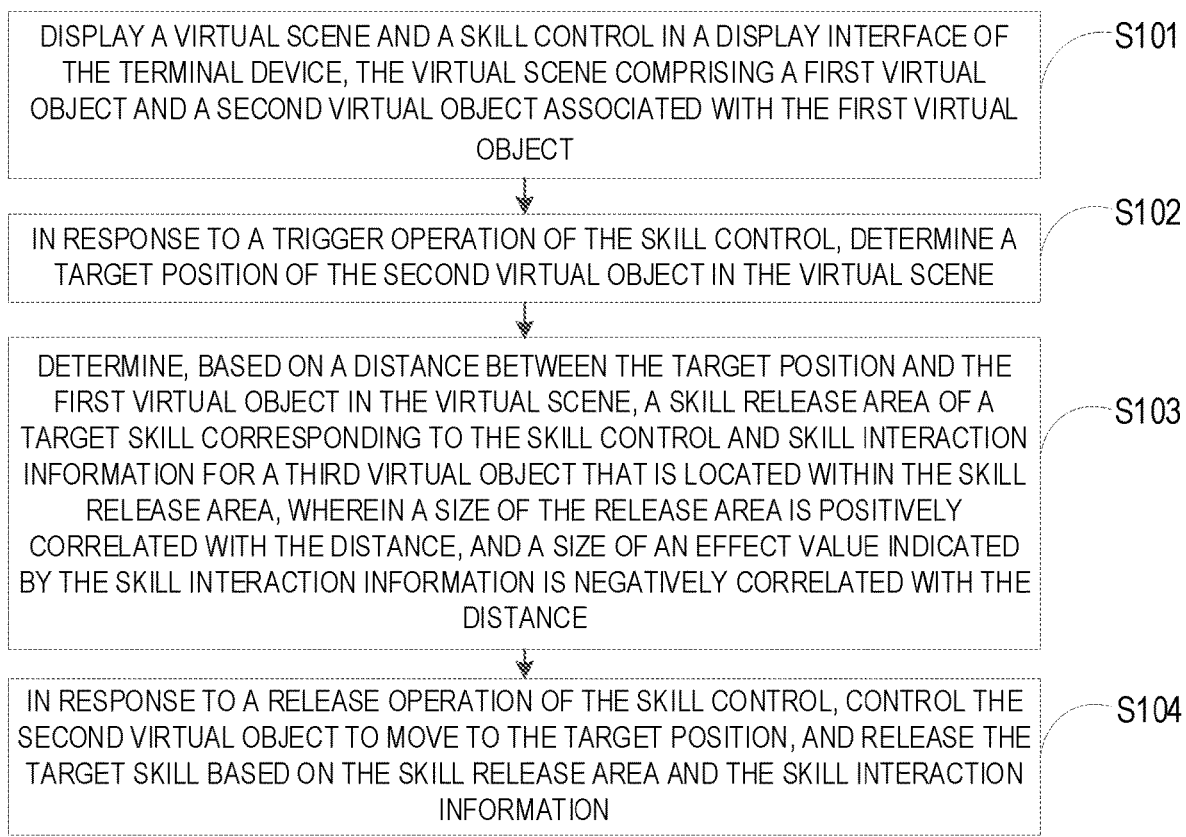

DISPLAY A VIRTUAL SCENE AND A SKILL CONTROL IN A DISPLAY INTERFACE OF THE TERMINAL DEVICE, THE VIRTUAL SCENE COMPRISING A FIRST VIRTUAL OBJECT AND A SECOND VIRTUAL OBJECT ASSOCIATED WITH THE FIRST VIRTUAL OBJECT ⟋S101

IN RESPONSE TO A TRIGGER OPERATION OF THE SKILL CONTROL, DETERMINE A TARGET POSITION OF THE SECOND VIRTUAL OBJECT IN THE VIRTUAL SCENE ⟋S102

DETERMINE, BASED ON A DISTANCE BETWEEN THE TARGET POSITION AND THE FIRST VIRTUAL OBJECT IN THE VIRTUAL SCENE, A SKILL RELEASE AREA OF A TARGET SKILL CORRESPONDING TO THE SKILL CONTROL AND SKILL INTERACTION INFORMATION FOR A THIRD VIRTUAL OBJECT THAT IS LOCATED WITHIN THE SKILL RELEASE AREA, WHEREIN A SIZE OF THE RELEASE AREA IS POSITIVELY CORRELATED WITH THE DISTANCE, AND A SIZE OF AN EFFECT VALUE INDICATED BY THE SKILL INTERACTION INFORMATION IS NEGATIVELY CORRELATED WITH THE DISTANCE ⟋S103

IN RESPONSE TO A RELEASE OPERATION OF THE SKILL CONTROL, CONTROL THE SECOND VIRTUAL OBJECT TO MOVE TO THE TARGET POSITION, AND RELEASE THE TARGET SKILL BASED ON THE SKILL RELEASE AREA AND THE SKILL INTERACTION INFORMATION ⟋S104

FIG. 1

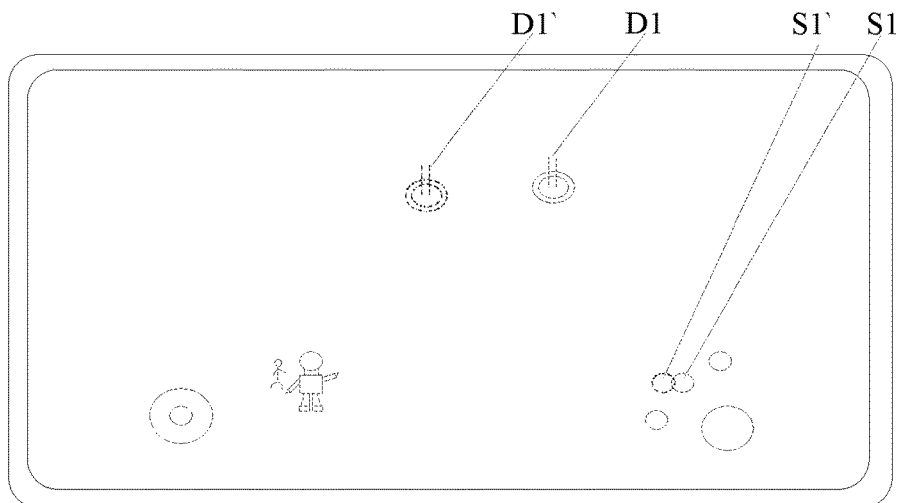

METHOD, APPARATUS, COMPUTER DEVICE, AND STORAGE MEDIUM FOR INTERACTION CONTROL

FIELD

This disclosure relates to the field of gaming, and specifically, to a method, apparatus, computer device, and storage medium for interaction control.

BACKGROUND

Currently, many scenarios involve frequent interactions between users and virtual objects in virtual scenes. For example, in games, players need to trigger virtual objects to release different skills through control buttons. When triggering skill release, the effect and effective range of the skills are usually fixed, and the interactivity is poor.

SUMMARY

Embodiments of the present disclosure at least provide a method, apparatus, computer device, and storage medium for interaction control.

In a first aspect, the embodiments of the present disclosure provide a method of interaction control, comprising: displaying a virtual scene and a skill control in a display interface of a terminal device, the virtual scene comprising a first virtual object and a second virtual object associated with the first virtual object;

in response to a trigger operation of the skill control, determining a target position of the second virtual object in the virtual scene;

determining, based on a distance between the target position and the first virtual object in the virtual scene, a skill release area of a target skill corresponding to the skill control and skill effect information for a third virtual object that is located within the skill release area, wherein a size of the release area is positively correlated with the distance, and a size of an effect value indicated by the skill effect information is negatively correlated with the distance; and in response to a release operation of the skill control, controlling the second virtual object to move to the target position, and releasing the target skill based on the skill release area and the skill effect information.

In an optional embodiment, in response to a trigger operation of the skill control, determining a target position of the second virtual object in the virtual scene comprises:

in response to a sliding operation of the skill control, determining a mapping position of the sliding operation in the virtual scene, wherein the mapping position changes as a sliding position of the sliding operation changes;

determining the target position of the second virtual object in the virtual scene based on the mapping position.

In an optional embodiment, determining, based on a distance between the target position and the first virtual object in the virtual scene, a skill release area of a target skill corresponding to the skill control and skill effect information for a third virtual object that is located within the skill release area comprises: determining, based on the distance between the target position and the first virtual object in the virtual scene, skill release areas respectively corresponding to the target skill corresponding to the skill control in a plurality of skill release stages and skill effect information for the third virtual object located within the corresponding skill release areas in the plurality of skill release stages.

In an optional embodiment, determining, based on the distance between the target position and the first virtual object in the virtual scene, skill release areas respectively corresponding to the target skill corresponding to the skill control in a plurality of skill release stages comprises:

determining the skill release area corresponding to an initial skill release stage of the target skill in the plurality of skill release stages based on the distance between the target position and the first virtual object in the virtual scene;

determining the skill release area corresponding to other skill release stages of the target skill based on correspondence among the plurality of skill release stages.

In an optional embodiment, determining the skill release area corresponding to other skill release stages of the target skill based on correspondence among the plurality of skill release stages comprises:

determining a size of the skill release area corresponding to the other skill release stages of the target skill based on the correspondence among the plurality of skill release stages;

determining an anchor position of the skill release area corresponding to the other skill release stages of the target skill;

determining the skill release area corresponding to the other skill release stages based on the size of the skill release area corresponding to the other skill release stages and the anchor position.

In an optional embodiment, when releasing the target skill based on the skill release area and the skill effect information further comprises:

controlling a movement of the third virtual object in the virtual scene based on the skill release areas respectively corresponding to a plurality of skill release stages, so that the third virtual object is located within the corresponding skill release areas during the plurality of skill release stages.

In an optional embodiment, the skill effect information comprises: the number of damages caused by the target skill to the third virtual object, and a damage value of each of the damages.

In an optional embodiment, durations corresponding to a plurality of skill release stages decrease in an order of the plurality of skill release stages.

In the second aspect, the embodiments of the present disclosure also provide an apparatus for interaction control, comprising:

a display module for displaying a virtual scene and a skill control in a display interface of a terminal device, the virtual scene comprising a first virtual object and a second virtual object associated with the first virtual object;

a first determination module for, in response to a trigger operation of the skill control, determining a target position of the second virtual object in the virtual scene;

a second determination module for determining, based on a distance between the target position and the first virtual object in the virtual scene, a skill release area of a target skill corresponding to the skill control and skill effect information for a third virtual object that is located within the skill release area, wherein a size of the release area is positively correlated with the distance, and a size of an effect value indicated by the skill effect information is negatively correlated with the distance; and an operation execution module for, in response to a release operation of the skill control, controlling the second virtual object to move to the target position, and releasing the target skill based on the skill release area and the skill effect information.

In an optional embodiment, when, in response to a trigger operation of the skill control, determining a target position of the second virtual object in the virtual scene, the first determination module is further for:

in response to a sliding operation of the skill control, determining a mapping position of the sliding operation in the virtual scene, wherein the mapping position changes as a sliding position of the sliding operation changes;

determining the target position of the second virtual object in the virtual scene based on the mapping position.

In an optional embodiment, in determining, based on a distance between the target position and the first virtual object in the virtual scene, a skill release area of a target skill corresponding to the skill control and skill effect information for a third virtual object that is located within the skill release area, the second determination module is further for:

determining, based on the distance between the target position and the first virtual object in the virtual scene, skill release areas respectively corresponding to the target skill corresponding to the skill control in a plurality of skill release stages and skill effect information for the third virtual object located within the corresponding skill release areas in the plurality of skill release stages.

In an optional embodiment, in determining, based on the distance between the target position and the first virtual object in the virtual scene, skill release areas respectively corresponding to the target skill corresponding to the skill control in a plurality of skill release stages, the second determination module is further for:

determining the skill release area corresponding to an initial skill release stage of the target skill in the plurality of skill release stages based on the distance between the target position and the first virtual object in the virtual scene; and determining the skill release area corresponding to other skill release stages of the target skill based on correspondence among the plurality of skill release stages.

In an optional embodiment, in determining the skill release area corresponding to other skill release stages of the target skill based on correspondence among the plurality of skill release stages, the second determination module is further for:

determining a size of the skill release area corresponding to the other skill release stages of the target skill based on the correspondence among the plurality of skill release stages;

determining an anchor position of the skill release area corresponding to the other skill release stages of the target skill;

determining the skill release area corresponding to the other skill release stages based on the size of the skill release area corresponding to the other skill release stages and the anchor position.

In an optional embodiment, releasing the target skill based on the skill release area and the skill effect information, the operation execution module is for:

controlling a movement of the third virtual object in the virtual scene based on the skill release areas respectively corresponding to a plurality of skill release stages, so that the third virtual object is located within the corresponding skill release areas during the plurality of skill release stages.

In a third aspect, optional embodiments of the present disclosure further provide a computer device comprising a processor and a memory, the memory storing machine-readable instructions executable by the processor. The processor is used to execute the machine-readable instructions stored in the memory, and when the machine-readable instructions are executed by the processor, the processor carries out the steps of the first aspect or any possible embodiments of the first aspect.

In a fourth aspect, the embodiments of the present disclosure further provide a computer readable storage medium storing a computer program thereon. The computer program, when executed, carries out the steps of the first aspect or any possible embodiments of the first aspect.

According to the method for interaction control provided by the embodiments of the present disclosure, a first virtual object controlled by a player and a second virtual object associated with the first virtual object are included in a virtual scene. As such, when a player triggers a skill control, the target position of the second virtual object is determined in the virtual scene, and the release range of the target skill and skill effect information are determined based on the distance between the first virtual object and the second virtual object. In this way, due to the positive correlation between the release range of the target skill and the distance and the negative correlation between the effect value indicated by the skill effect information and the distance, the user is able to independently control the release range of the target skill and the skill effect information by adjusting the distance between the first virtual object and the second virtual object according to the actual requirements in the game when releasing the target skill. This provides users with more ways to release skills and enhances interactivity during the skill release process.

In order to make the above objectives, features, and advantages of this disclosure more apparent and understandable, the following text provides preferred embodiments, and in conjunction with the accompanying drawings, provides a detailed explanation as follows.

BRIEF DESCRIPTION OF THE DRAWINGS

In order to provide a clearer explanation of the technical solution of the embodiments of the present disclosures, a brief introduction will be given to the accompanying drawings required in the embodiments. The accompanying drawings are incorporated into the specification and form a part of the specification. These drawings illustrate embodiments that comply with the present disclosure and are used together with the specification to illustrate the technical solution of the present disclosure. It should be understood that the following drawings only illustrate certain embodiments of the present disclosure, and therefore should not be regarded as limiting the scope. For ordinary technical personnel in the art, other relevant drawings can also be obtained based on these drawings without creative labor.

FIG. 1 illustrates a flowchart of a method of interaction control provided by some embodiments of the present disclosure;

FIG. 2 illustrates an example diagram of determining a target position of a second virtual object provided by some embodiments of the present disclosure;

DETAILED DESCRIPTION

Figure 3:
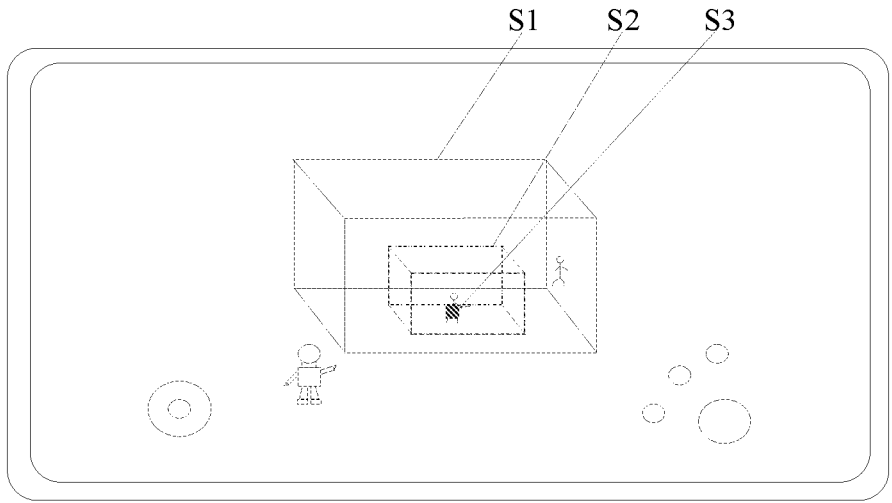
FIG. 3 illustrates example diagrams of the plurality of skill release stages provided by some embodiments of the present disclosure.

In order to make the purpose, technical solution, and advantages of embodiments of the present disclosures clearer, the following will provide a clear and complete description of the technical solution in embodiments of the present disclosures in conjunction with the accompanying drawings. Obviously, the described embodiments are only a part of embodiments of the present disclosures, not all of them. The components of embodiments of the present disclosures typically described and shown here may be arranged and designed in various different configurations. Therefore, the following detailed description of the embodiments of the present disclosure is not intended to limit the scope of the claimed protection, but only to represent the selected embodiments of the present disclosure. Based on the embodiments of the present disclosures, all other embodiments obtained by those skilled in the art without creative labor fall within the scope of protection of this disclosure.

Through research, it has been found that in scenarios where users interact with virtual objects in virtual scenes, such as in games, players may interact with virtual objects in virtual scenes through operation buttons in a display interface. For example, the operation buttons in the display interface include skill release buttons, and players may control the virtual objects in the game to release skills by clicking the skill release button. When triggering the release of a skill, it is usually done by clicking the skill button and sliding it in the display interface of a terminal device to determine a location of the skill release, and then the virtual object releases the corresponding skill based on that location. This skill release method can only control the release position of the skill, and the effective range of the skill is usually fixed, resulting in a relatively low level of player control over the game, leading to poor interactivity.

Taking role-playing games as an example, in this type of game, players control virtual objects to interact in the virtual scene, such as, combat, collection, and so on. When players are in combat, they usually face various situations, and need to consider factors, such as, the position and number of objects on which the skill to be released when releasing skills. However, currently, some skills usually only have fixed skill releasing areas and damage values, as a result, when facing different situations, players may only respond by releasing skills with different ranges. This interaction way only involves dragging the skill to the location of the skill release target, and the release range of the skill cannot be controlled by the player. Meanwhile, the skill effect of the skill is relatively fixed.

Based on the above research, the present disclosure provides a method of interaction control that allows the player to freely control a target position of a second virtual object, and then release a target skill between a first virtual object and the second virtual object. As a release range of the target skill and an effect value of skill effect information are correlated to the distance, the larger the distance, the larger the release range and the smaller the effect value, while the smaller the distance, the smaller the release range and the larger the effect value. The player can change the release range and a size of the effect value of the target skill by controlling the target position of the second virtual object in the virtual scene. In this way, when facing different situations in the virtual scene, the player can adjust the corresponding skill release strategy, thereby improving the controllability of the skill release process and enhancing the interactivity of the game.

The shortcomings of the above solutions are all the results of the inventor's practice and careful study. Therefore, the discovery process of the above problems and the solutions proposed by the present disclosure in the following text should all be the contributions made by the inventor to the present disclosure process.

It should be noted that similar labels and letters represent similar terms in the following figures, so once an item is defined in a figure, further definition and explanation are not required in subsequent figures.

For the convenience of understanding the present embodiment, a detailed introduction is first given to a method of interaction control disclosed in the embodiments of the present disclosure. The executing entity of the method of interaction control provided in the embodiments of the present disclosure is generally a computer device with certain computing power, which includes, for example, terminal devices, servers, or other processing devices, Terminal devices include, for example, touch terminals and personal computer (PC) terminals. Touch terminals, such as smartphones, tablets, etc.; PC terminals, such as desktop computers, laptops, etc.

Among them, the terminal device is installed with an application program equipped with this method. It should be noted that the application program may also run on a server and complete relevant data processing through the server. The terminal device acts as a display device to display the data sent by the server. When the application is running on the terminal device, the virtual scene is displayed in the interface of the terminal device; the virtual scene includes virtual objects.

The method of interaction control provided in the embodiments of the present disclosure can be applied to any virtual scene that performs interaction control on virtual objects, such as games, virtual communities established based on virtual scenes, etc. The method of interaction control provided in this disclosed embodiment is not only applicable to role-playing games, but also to other types of games, such as action games, shooting games, real-time strategy games, etc.

There may be situations where skills need to be released through control buttons and the range of skills cannot be adjusted.

Taking the application of the method of interaction control provided in the embodiments of the present disclosure to a game as an example, when the game is running on a terminal device, the interface of the terminal device may display the virtual scene of the game. Including virtual objects in virtual scenes. Virtual objects may include, but are not limited to, virtual objects manipulated by users, non player characters (NPCs). The virtual objects may include, but are not limited to, at least one of virtual characters and virtual animals. The virtual objects that can be controlled by users, and non user roles are set according to the needs of the game. Thus, no specific restrictions are made here.

In addition, virtual objects may also include: virtual buildings, virtual plants, virtual props, etc. For example, when the target game is a role-playing game, the virtual scene of the game includes virtual objects, as well as virtual buildings, virtual roads, and other virtual scenes. Players may control the virtual objects to complete operations such as movement, combat, collection, and construction in the virtual scene through control buttons.

The method of interaction control provided by the embodiments of the present disclosure will be explained below.

As shown in FIG. 1, which is the flowchart of the method of interaction control provided in the embodiments of the present disclosure, the method comprises steps S101 to S104, wherein:

S101: display a virtual scene and a skill control in a display interface of the terminal device, the virtual scene comprising a first virtual object and a second virtual object associated with the first virtual object.

S102: in response to a trigger operation of the skill control, determine a target position of the second virtual object in the virtual scene.

S103: determine, based on a distance between the target position and the first virtual object in the virtual scene, a skill release area of a target skill corresponding to the skill control and skill effect information for a third virtual object that is located within the skill release area, wherein a size of the release area is positively correlated with the distance, and a size of an effect value indicated by the skill effect information is negatively correlated with the distance.

S104: in response to a release operation of the skill control, control the second virtual object to move to the target position, and releasing the target skill based on the skill release area and the skill effect information.

In the above steps provided in this disclosure, the virtual scene includes a first virtual object controlled by a player and a second virtual object associated with the first virtual object. When a player triggers a skill control, the target position of the second virtual object is determined in the virtual scene based on the player's trigger operation, and the release range of the target skill and information on the role of skills are determined based on the distance between the first virtual object and the second virtual object. In this way, due to the positive correlation between the release range of the target skill and the distance, and the negative correlation between the effect value indicated by the skill effect information and the distance, users may independently control the release range of the target skill and the skill effect information by adjusting the distance between the first virtual object and the second virtual object according to actual game needs when releasing the target skill. This provides users with more ways to release skills and enhances interactivity during the skill release process.

For S101 mentioned above, in a virtual scene, the first virtual object and the second virtual object associated with the first virtual object are virtual objects controlled by the player.

For example, players control the first virtual object to complete operations such as movement, combat, collection, and construction in the virtual scene through mobile controls and skill controls. Skill controls are used to summon/retract the second virtual object. After summoning the second virtual object, the second virtual object will follow the movement of the first virtual object controlled by the player. Alternatively, the second virtual object may be controlled to move independently in the virtual scene through a separate movement control. Alternatively, the second virtual object may be controlled to move independently in the virtual scene through a mobile switching control. For example, when a player triggers the mobile switching control, the mobile control that originally controlled the movement of the first virtual object will become the mobile control that controlled the movement of the second virtual object.

The mobile control may be a virtual joystick or a virtual move button, and players may control the movement of the first virtual object and/or the second virtual object by sliding the virtual joystick or triggering the virtual move button. Skill controls, such as skill buttons, may be used to select, confirm, and release skill release positions through actions such as triggering, pressing, and sliding.

As another example, the association between the first virtual object and the second virtual object may comprise: the second virtual object remains next to the first virtual object and moves with the movement of the first virtual object; the second virtual object is not attacked, and disappears when the first virtual object dies in battle. When the player triggers the control button corresponding to a skill that requires the participation of a second virtual object to be released, the second virtual object participates in the process of releasing the skill. After the skill is released, the second virtual object returns to the first virtual object.

The association between the first virtual object and the second virtual object may also comprises, for example: in response to the player triggering the target button to summon the second virtual object, summoning the second virtual object to the virtual scene, assisting the first virtual object in combat, and conducting ordinary attacks on enemy targets. At the same time, the second virtual object will also be attacked by enemy targets. When the player triggers the control button corresponding to a skill that requires the participation of a second virtual object to be released, the second virtual object interrupts the attack action and cooperates with the first virtual object to release the skill. After the skill is released, the battle begins again. When the second virtual object dies in battle, lock the skills that require the participation of the second virtual object to be released, and enter the cooldown timer. After the cooldown timer ends, the second virtual object may be summoned to the virtual scene again and the skills that require the participation of the second virtual object to be released may be unlocked.

For example, the first virtual object is a virtual character, and the second virtual object is a magic puppet that may be controlled by the character. The virtual character and the magic puppet cooperate with each other to complete the release process of skills.

For S102, in response to a trigger operation of the skill control, determining a target position of the second virtual object in the virtual scene comprises: in response to a sliding operation of the skill control, determining a mapping position of the sliding operation in the virtual scene, wherein the mapping position changes as a sliding position of the sliding operation changes; and determining the target position of the second virtual object in the virtual scene based on the mapping position.

FIG. 2 illustrates an example of determining the target position of the second virtual object. When the player's finger is pressed on the skill control S1, the mapping position D1 of the second virtual object is displayed in the virtual scene. At this time, after the player's finger is pressed on the skill control and the mapping position D1 of the second virtual object is displayed in the virtual scene, the skill control slides from S1 to S1, and the mapping position moves from D1 to D1. At this point, the player releases their finger and maps the position D1' to determine the target position of the second virtual object in the virtual scene.

In one possible embodiment, when the player presses the skill control and slides to select the target position of the second virtual object, he/she may slide his/her finger to a predefined position to cancel the release of the target skill. For example, by sliding the finger to the predefined skill cancel release button on the display interface to cancel the release of the target skill, the virtual special effect mapped to the position may remind the player by changing the color reminder. If the skill control is released at this time, the target skill will be cancelled from being released.

In another example, the player may also instantaneously release target skills by clicking on the skill control. When the player clicks on the skill control with a finger, the second virtual object moves to a predetermined distance from the direction in front of the first virtual object. This predefined distance is usually a predetermined fixed distance, which may be set by the player or the default setting of the game.

For S103 mentioned above, after determining the target position of the second virtual object in the virtual scene, it is possible to determine the skill release area of the target skill between the first and second virtual objects as well as the skill effect information of the third virtual object located within the skill release area.

As an example, the third virtual object may be an enemy virtual object controlled by another player in a different faction from the first virtual object, a friendly virtual object controlled by another player in the same faction as the first virtual object, or a friendly virtual object controlled by the player belonging to their own team, or an enemy virtual object and friendly virtual object not controlled by the player in the game.

The release target of the target skill may be only for enemy virtual objects, only for friendly virtual objects, or for all virtual objects.

If the release target of the target skill is an enemy virtual object, the effect information of the skill may be determined based on the distance between the first virtual object and the second virtual object. At this time, the effect value may be expressed as the damage value caused to the enemy virtual object, or as the value of the reduction effect such as deceleration, dizziness, and forced displacement applied to the enemy virtual object.

If the skill release target of the target skill is a friendly virtual object, the skill effect information may be determined based on the distance between the first virtual object and the second virtual object, for example, to determine the size of the effect value. At this time, the effect value may be expressed as the treatment value for the friendly virtual object, or as the value for applying acceleration, shield, resistance, and other gain effects to the friendly virtual object.

If the skill release target of the target skill includes enemy virtual objects and friendly virtual objects, the above scheme may be used to cause damage to the enemy virtual objects, apply reduction effects, and treat and apply gain effects to the friendly virtual objects. The specific skill setting is determined based on the target skill, and this disclosure does not impose any limitations on this.

The skill release area of the target skill, as well as the size of the effect value received by the third virtual object within the skill release area, will be affected by the distance between the target position of the second virtual object and the first virtual object in the virtual scene.

As an example, the larger the distance between the target position of the second virtual object and the first virtual object in the virtual scene, the larger the skill release area. The third virtual object located in the skill release area receives a smaller effect value, which means that the distance is positively correlated with the skill release area and negatively correlated with the effect value received by the third virtual object in the skill release area. The correlation here is only used as an example for the present disclosure. It may also be a positive correlation between distance and the effect value received by the third virtual object in the skill release area or other easily thought of correlations.

In some embodiments provided in this disclosure, based on the distance between the target position and the first virtual object in the virtual scene, it is determined the skill release areas corresponding to the target skill corresponding to the skill control in a plurality of skill release stages are determined, as well as the skill effect information for the third virtual object located within the corresponding skill release areas in the plurality of skill release stages.

As an example, the target skill is divided into a plurality of skill release stages, with each of the skill release stages corresponding to a skill release area. The skill release area is the largest when the target skill is in the initial skill release stage, then decreases in sequence, and finally explodes and disappears when the skill release area is 0. The effect value received by the third virtual object in the corresponding skill release area is the smallest at the initial stage of the target skill, then increases in sequence, and finally reaches the highest effect value when the skill release area is 0.

After determining the plurality of skill release stages, the size of the skill release area in each skill release stage will also vary depending on the target location of the second virtual object and the distance of the first virtual object in the virtual scene.

Specifically, in some embodiments of the present disclosure, based on the distance between the target location and the first virtual object in the virtual scene, a skill release area corresponding to the initial skill release stage of the target skill in the plurality of skill release stages is determined. Based on the correspondence among the plurality of skill release stages, the skill release areas corresponding to other skill release stages of the target skill are determined.

By way of example, the plurality of skill release stages of the target skill comprise an initial skill release stage and a plurality of skill release stages. In the example diagram of the plurality of skill release stages shown in FIG. 3, the target skill has three skill release stages. According to the target skill release process or the size of the skill release area, the initial skill release stage A1, skill release stage A2, and skill release stage A3 are sequentially arranged. The correspondence among the plurality of skill release areas may be determined as follows: after determining the skill release area S1 corresponding to the initial skill release stage A1 of the target skill in the plurality of skill release stages, the size of the skill release area S2 corresponding to skill release stage A2 and the skill release area S3 corresponding to skill release stage A3 may be obtained by multiplying the size of the skill release area S1 by a certain coefficient. For example, the size of skill release area S2 is determined by multiplying the size of skill release area S1 by 0.4. The size of skill release area S3 is determined by multiplying the size of skill release area S1 by 0.1. The skill release area S3 serves as the final size of the skill. After passing through skill release stage A3, the skill release area explodes and disappears.

Here, the size of skill release area S3 corresponding to skill release stage A3 may also be considered as 0. When the size of the target skill's skill release area shrinks to 0, the skill release area explodes and disappears. The above skill release area S3 is multiplied by 0.1 based on the size of skill release area S1, to represent the correspondence between the plurality of skill release stages. In practice, it is only necessary to match a certain correspondence among the plurality of skill release areas during the release process of the target skill. Therefore, the correspondence among the plurality of skill release areas may also be determined by setting a fixed coefficient. The size of the skill release area in each skill release stage is determined by multiplying the size of the previous skill release area by a fixed coefficient, for example, the size of the skill release area corresponding to each skill release stage after the initial skill release stage is determined by multiplying the size of the skill release area corresponding to the previous skill release stage by 0.5. When the skill release stage reaches a certain number of times or the skill release area shrinks to a certain size, the size of the skill release area corresponding to the next skill release stage is determined to be 0.

In addition, the correspondence between the plurality of skill release areas may also be sequentially increased, such as the initial skill release area being the smallest, followed by a certain proportion of sequentially increasing skill release areas, or other easily thought of correspondences, such as changing in a certain linear rule, etc. This disclosure does not imply any limitations in this regard.

Specifically, in some embodiments of the present disclosure, based on the correspondence among the plurality of skill release stages, the size of the skill release area corresponding to other skill release stages of the target skill is determined; the anchor positions of the skill release areas corresponding to the other skill release stages of the target skill are determined; based on the sizes of the skill release areas corresponding to the other skill release stages and the anchor positions, the skill release areas corresponding to the other skill release stages are determined.

For example, the initial skill release area of the target skill may be a cube. In the initial skill release stage of the plurality of skill release stages, the initial skill release area is determined based on the distance between the target position of the second virtual object and the first virtual object in the virtual scene. For example, the target position of the second virtual object may be determined as a vertex of the diagonal at the bottom of the cube. The position of the vertex in the virtual scene is also the anchor position of the initial skill release area. The position of the first virtual object in the virtual scene is determined as the other vertex of the diagonal (the other anchor position of the initial skill release area). The diagonal of the bottom of the cube is determined according to the two vertices, and then the bottom area of the cube may be determined. Then the range of the rectangular cuboid is determined according to the predefined height of the cube. This is the initial skill release area.

Here, the initial skill release area of the target skill may also be other regular shapes such as spheres, cylinders, etc. The anchor position may be determined based on the information required to determine the volume of each regular shape. Considering an example where the skill release area is a cylinder, two anchor positions may be determined based on the position of the first virtual object and the position of the second virtual object, and then the position of the third anchor point is determined based on the center point between the two virtual objects, and the skill release area may be determined based on the above three anchor points and the predefined height. In addition, the initial skill release area may also be other irregular shapes, and the anchor position may be determined based on the specific shape, which will not be repeated here.

After determining the initial skill release area, the corresponding skill release areas for all skill release stages of the target skill may be determined based on the correspondence among the initial skill release area and the corresponding skill release areas for each skill release stage.

In addition, it is also possible to determine the skill effect information for the third virtual object located within the skill release area as well as the correspondence between the plurality of skill release areas based on the distance between the target position of the second virtual object and the first virtual object in the virtual scene.

Specifically, in some embodiments of the present disclosure, when the target skill causes damage to a third virtual object, the skill effect information includes the number of times the target skill causes damage to the third virtual object, as well as the damage value for each injury.

For example, the target skill may be causing a plurality of stages of damage to the third virtual object (i.e., an enemy virtual object) within the skill release area. The damage value of each stage is the same during the same skill release stage. In different skill release stages, as the skill release area shrinks, the number of damage times is fixed, and the damage value of each stage will increase accordingly. In addition, during the plurality of skill release stages, the damage value of each stage caused to enemy virtual objects may be fixed, but as the skill release area shrinks, the number of damages caused will increase accordingly. During the target skill release process, as the skill release area shrinks, the damage value of the corresponding skill release stage in the skill release area increases.

In another example, when the target skill is treating the third virtual object in the skill release area (at this time, the third virtual object is the own virtual object), the number of times the target skill treats the own virtual object and the amount of treatment each time may also be calculated using the above formula. That is, during the target skill release process, the number of treatments is fixed at different skill release stages. As the skill release area shrinks, the amount of treatment per treatment increases. Alternatively, in different skill release stages, the number of treatments increases as the skill release area shrinks, but the amount of treatment per treatment is the same.

In addition, in other embodiments provided by the present disclosure, the target skill has a fixed skill release duration, and the durations corresponding to the plurality of skill release stages decrease in the order of the plurality of skill release stages.

As an example, in the process of releasing a target skill, as the plurality of skill release stages proceeds in sequence, the duration of each skill release stage correspondingly decreases. For example, the target skill has three skill release stages, which are divided into the first, second, and third stages according to the order of skill release. If the total release duration of the target skill is 8 seconds, the first stage may be 5 seconds The second stage may be 2.5 seconds, and the third stage may be 0.5 seconds.

In addition, the duration of the plurality of skill release stages may also be associated with the skill release area. For example, the larger the skill release area, the longer the duration of the corresponding skill release stage in the skill release area.

In response to the player's release operation of the skill control, which involves releasing the skill control with their fingers, the second virtual object moves to the target position and releases the target skill based on the determined skill release area and skill effect information.

As an example, considering an example where the enemy virtual object in the third virtual object is the target of the skill release of the target skill, after the second virtual object moves to the target position, a rectangular cuboid magnetic field is generated between the second virtual object and the first virtual object according to the distance between the second virtual object and the first virtual object. After the magnetic field is generated, the second virtual object returns to the first virtual object, enemy virtual objects in the magnetic field will be subjected to electromagnetic attacks, which may be multi-stage attacks. That is, for every unit of time, electromagnetic damage will be caused to the third virtual object in the magnetic field. The unit time may be set to 0.1 seconds, 0.5 seconds, 1 second, etc., depending on the actual game needs. This disclosed embodiment is not limited.

In addition, the target skill may also have other forms of skills in addition to the magnetic field form, such as generating a poisonous fog form space between the second virtual object and the first virtual object, in which the enemy virtual object will be damaged by poison gas, or other easily thought of skill forms such as frost form, flame form, etc.

For example, skill forms may also be associated with skill effect information. For example, when the skill form generates a space of frost form between the second virtual object and the first virtual object, enemy virtual objects within the release range of the skill will not only suffer damage but also be subject to freezing control effects.

After releasing the target skill, it will go through the plurality of skill release stages, during which the third virtual object will be limited to the corresponding skill release area for each skill release stage.

Specifically, in some embodiments of the present disclosure, based on the skill release areas corresponding to the plurality of skill release stages, the third virtual object is controlled to move in the virtual scene, so that the third virtual object is located within the corresponding skill release areas during the plurality of skill release stages.

As an example, in the plurality of skill release stages of the target skill, the corresponding skill release range is sequentially reduced according to the order of skill release stages. During the process of shrinking the skill release area, the third virtual object that exists at the edge of the skill release area will be forced to move towards the center position of the contraction of the skill release area, wherein the center position of the contraction of the skill release area may be either the center point of the initial skill release area or the target position of the second virtual object.

Figure 4A:
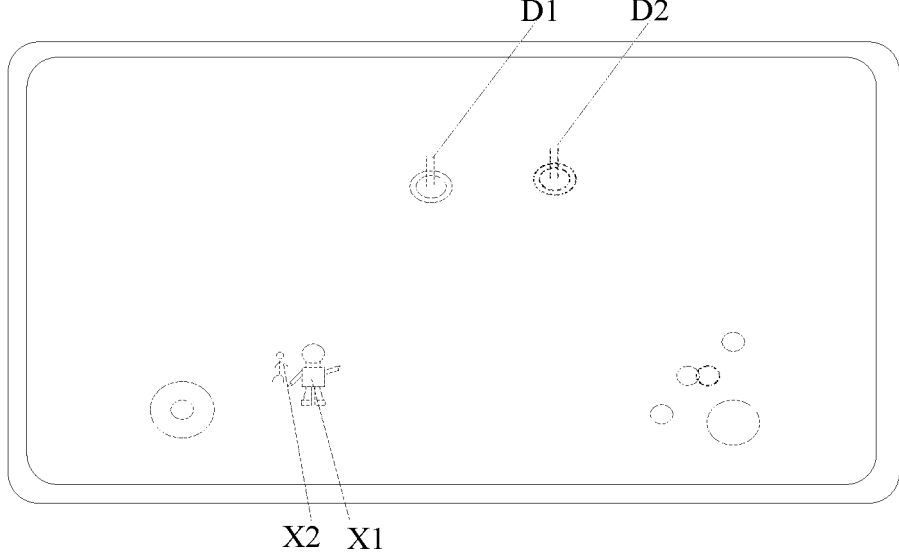
FIG. 4*a* illustrates example diagrams of determining the target positions in a virtual scene provided by some embodiments of the present disclosure.
Figure 4B:
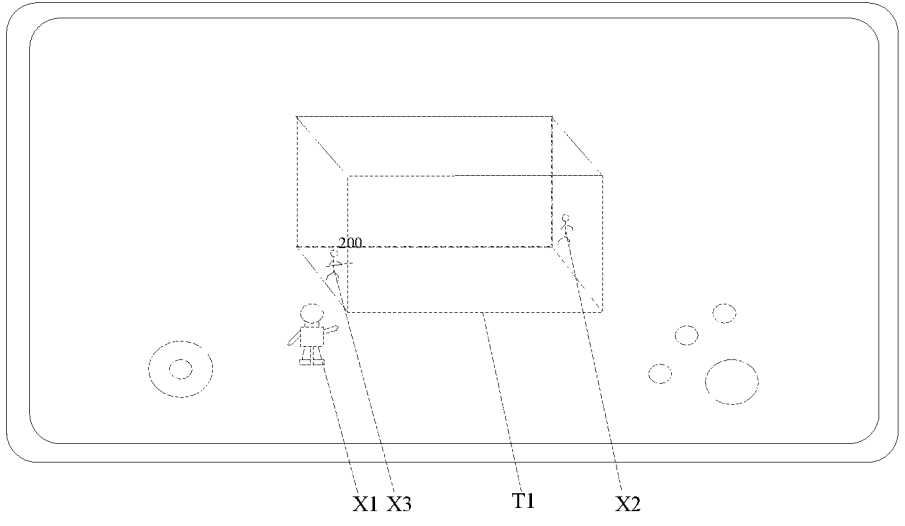
FIG. 4*b* illustrates an example diagram of a first stage of the target skills provided by some embodiments of the present disclosure.
Figure 4C:
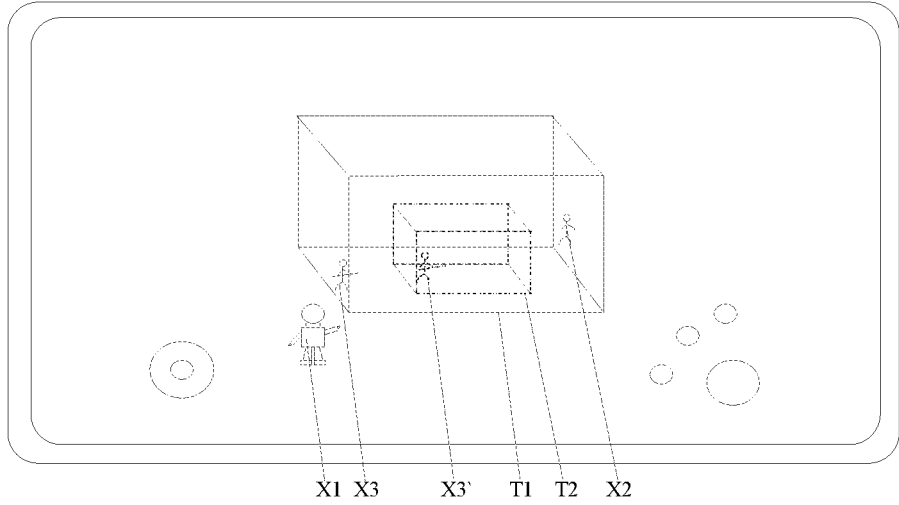
FIG. 4*c* illustrates an example diagram of the target skill shrinking from the first stage to the second stage provided in some embodiments of the present disclosure.
Figure 4D:
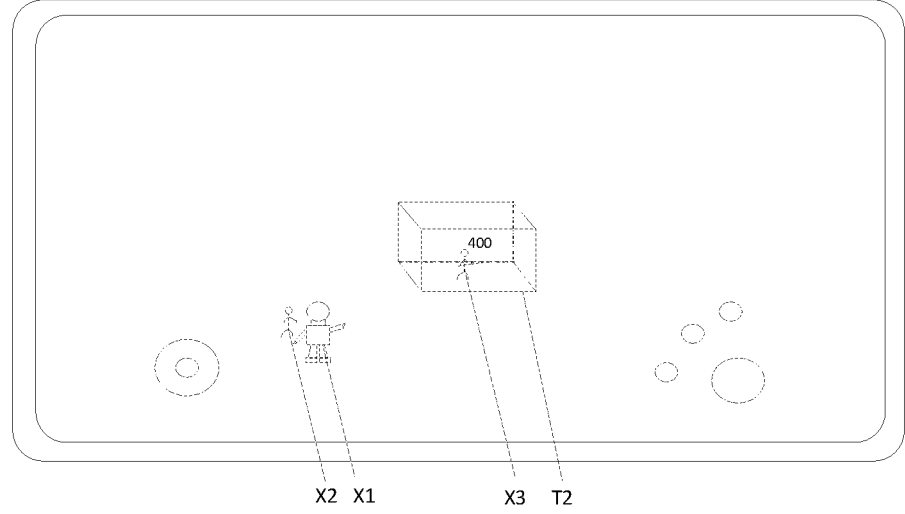
FIG. 4*d* illustrates an example diagram of a second stage of the target skill provided by some embodiments of the present disclosure.
Figure 4E:
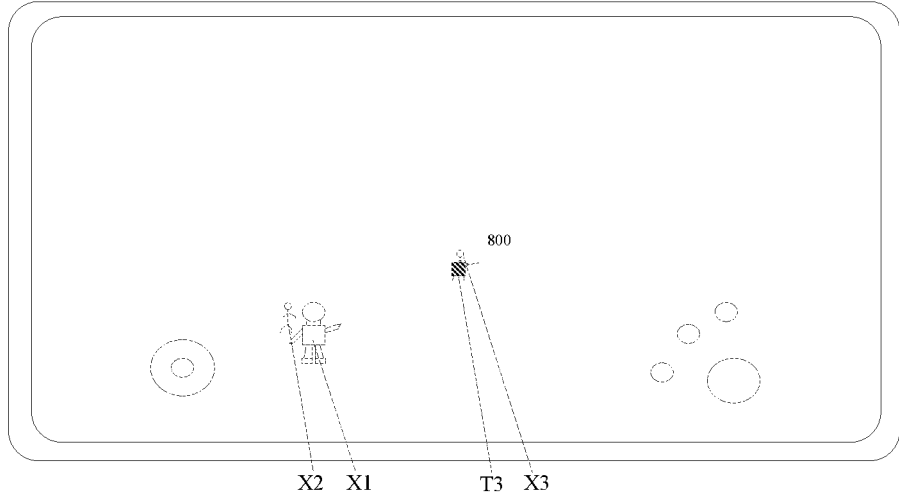
FIG. 4*e* illustrates an example diagram of a third stage of the target skill provided by some embodiments of the present disclosure.

The present disclosure also provides a specific example of interaction control, as shown in FIGS. 4a to 4e. The specific process is illustrated in FIG. 4a, which is an example of determining the target position in a virtual scene. The player controls the first virtual object X1 to fight in the virtual scene, and the second virtual object X2 follows the first virtual object X1. When the player presses the skill control corresponding to the target skill, the mapping position D1 of the second virtual object is generated in the virtual scene. The mapping position is represented as a light column in the virtual scene, and then the player controls the movement of the light column in the virtual scene through sliding operation. When the light column moves to the target position D2, the player releases the control component, as illustrated in the example diagram of the first stage of the target skill shown in FIG. 4b. After the second virtual object moves to the target position D2, a rectangular cuboid magnetic field is released between the second virtual object X2 and the first virtual object X1. At this time, the first stage of target skill is entered. The enemy virtual object X3 located in the rectangular cuboid magnetic field will receive an electromagnetic attack every 0.5 seconds, and each electromagnetic attack will receive 200 points of damage. After 4 seconds, the rectangular cuboid magnetic field will rotate and narrow the range of skill release to enter the second stage of target skill. Referring to the example diagram of target skill shrinking from the first stage to the second stage shown in FIG. 4c, in the process of the Rectangular cuboid magnetic field from the first stage T1 to the second stage T2, the enemy virtual object X3 at the edge of the magnetic field is forced to move in the contracting direction, from the position of the enemy virtual object X3 to the position of the enemy virtual object X3'. As shown in the example diagram of the second stage of target skills in FIG. 4d, the enemy virtual object X3 in the rectangular cuboid magnetic field of the second stage T2 will be subjected to an electromagnetic attack every 0.5 seconds, and each electromagnetic attack will take 400 points of damage. After 1.5 seconds, it will enter the third stage of the target skill, as shown in the example diagram of the third stage of the target skill in FIG. 4e. At this time, the rectangular cuboid magnetic field of T3 in the third stage shrinks to the minimum, and an explosion occurs. The third virtual object within the explosion range will take 800 points of damage, and then the magnetic field disappears.

The above skill time, damage value, number of attacks, and other numerical values are only used to illustrate the correspondence between the plurality of skill release stages during the release process of the target skill. This disclosed embodiment is not limited.

Those skilled in the art will understand that in the specific embodiment methods mentioned above, the writing order of each step does not imply a strict execution order and imposes any restrictions on the embodiment process. The specific execution order of each step should be determined based on its function and possible internal logic.

Based on the same inventive concept, an apparatus for interaction control corresponding to the method of interaction control is also provided in the embodiments of the present disclosure. Since the principle of solving the problem in the device in the embodiments of the present disclosure is similar to the method of interaction control mentioned in the embodiments of the present disclosure, the embodiment of the device may be referred to in the embodiment of the method, and any repetition will not be repeated.

Figure 5:
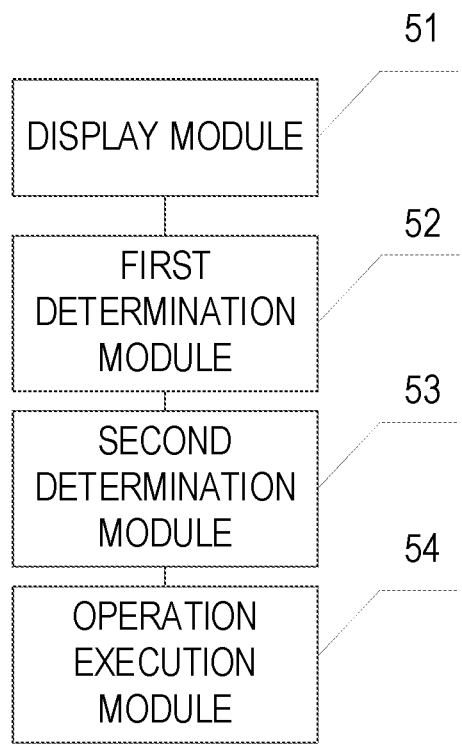
FIG. 5 illustrates a schematic diagram of an apparatus for interaction control provided by some embodiments of the present disclosure.

Referring to FIG. 5, which is a schematic diagram of an apparatus for interaction control provided in the embodiments of the present disclosure includes a display module 51, a first determination module 52, a second determination module 53, and an operation execution module 54.

The display module 51 is for displaying a virtual scene and a skill control in a display interface of the terminal device, the virtual scene comprising a first virtual object and a second virtual object associated with the first virtual object.

The first determination module 52 is for, in response to a trigger operation of the skill control, determining a target position of the second virtual object in the virtual scene.

The second determination module 53 is for determining, based on a distance between the target position and the first virtual object in the virtual scene, a skill release area of a target skill corresponding to the skill control and skill effect information for a third virtual object that is located within the skill release area, wherein a size of the release area is positively correlated with the distance, and a size of an effect value indicated by the skill effect information is negatively correlated with the distance.

The operation execution module 54 is for, in response to a release operation of the skill control, controlling the second virtual object to move to the target position, and releasing the target skill based on the skill release area and the skill effect information.

In an optional embodiment, when, in response to a trigger operation of the skill control, determining a target position of the second virtual object in the virtual scene, the first determination module 52 is further for:

in response to a sliding operation of the skill control, determining a mapping position of the sliding operation in the virtual scene, wherein the mapping position changes as a sliding position of the sliding operation changes;

determining the target position of the second virtual object in the virtual scene based on the mapping position.

In an optional embodiment, in determining, based on a distance between the target position and the first virtual object in the virtual scene, a skill release area of a target skill corresponding to the skill control and skill effect information for a third virtual object that is located within the skill release area, the second determination module 53 is further for:

determining, based on the distance between the target position and the first virtual object in the virtual scene, skill release areas respectively corresponding to the target skill corresponding to the skill control in a plurality of skill release stages and skill effect information for the third virtual object located within the corresponding skill release areas in the plurality of skill release stages.

In an optional embodiment, in determining, based on the distance between the target position and the first virtual object in the virtual scene, skill release areas respectively corresponding to the target skill corresponding to the skill control in a plurality of skill release stages, the second determination module 53 is further for:

determining the skill release area corresponding to an initial skill release stage of the target skill in the plurality of skill release stages based on the distance between the target position and the first virtual object in the virtual scene; and determining the skill release area corresponding to other skill release stages of the target skill based on correspondence among the plurality of skill release stages.

In an optional embodiment, in determining the skill release area corresponding to other skill release stages of the target skill based on correspondence among the plurality of skill release stages, the second determination module 53 is further for:

determining a size of the skill release area corresponding to the other skill release stages of the target skill based on the correspondence among the plurality of skill release stages;

determining an anchor position of the skill release area corresponding to the other skill release stages of the target skill;

determining the skill release area corresponding to the other skill release stages based on the size of the skill release area corresponding to the other skill release stages and the anchor position.

In an optional embodiment, releasing the target skill based on the skill release area and the skill effect information, the operation execution module 54 is for:

controlling a movement of the third virtual object in the virtual scene based on the skill release areas respectively corresponding to a plurality of skill release stages, so that the third virtual object is located within the corresponding skill release areas during the plurality of skill release stages The description of the processing flow of each module in the device, as well as the interaction flow between each module, may refer to the relevant instructions in the above method embodiments, and thus will not be detailed here.

Figure 6:
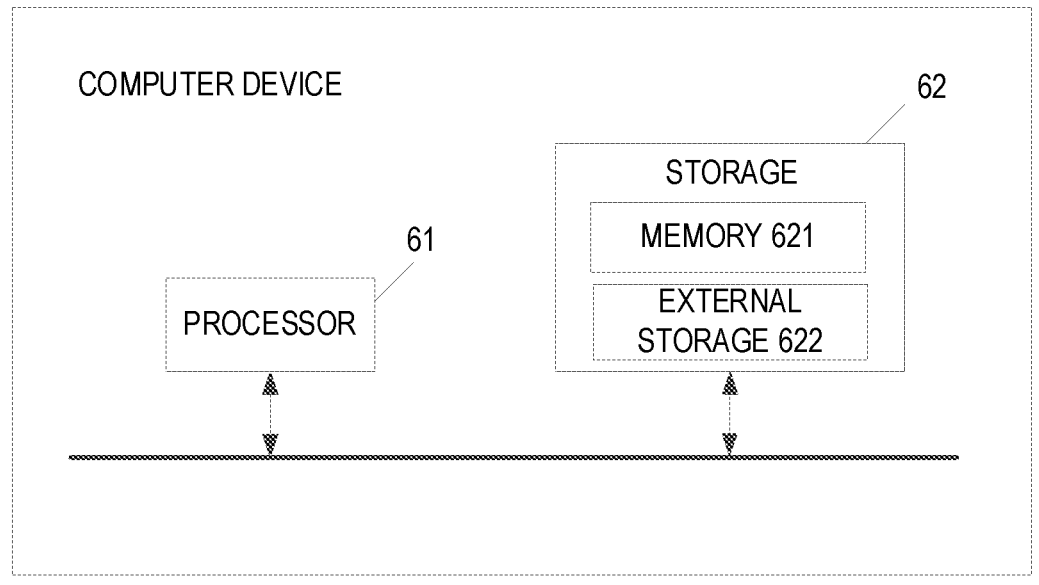
FIG. 6 illustrates a schematic diagram of a computer device provided in some embodiments of the present disclosure.

The embodiments of the present disclosure also provide a computer device, as shown in FIG. 6, which is a structural schematic diagram of the computer device provided by the embodiments of the present disclosure, comprising:

a processor 61 and a storage 62. The storage 62 stores machine-readable instructions executable by the processor 61, which is used to execute the machine-readable instructions stored in the storage 62. When the machine-readable instructions are executed by the processor 61, the processor 61 performs the following steps:

displaying a virtual scene and a skill control in a display interface of the terminal device, the virtual scene comprising a first virtual object and a second virtual object associated with the first virtual object;

in response to a trigger operation of the skill control, determining a target position of the second virtual object in the virtual scene;

determining, based on a distance between the target position and the first virtual object in the virtual scene, a skill release area of a target skill corresponding to the skill control and skill effect information for a third virtual object that is located within the skill release area, wherein a size of the release area is positively correlated with the distance, and a size of an effect value indicated by the skill effect information is negatively correlated with the distance; and in response to a release operation of the skill control, controlling the second virtual object to move to the target position, and releasing the target skill based on the skill release area and the skill effect information.

The above-mentioned storage 62 comprises a memory 621 and an external storage 622; Herein, the memory 621 is also called an internal memory, which is used to temporarily store the operational data in the processor 61 and the data exchanged with the external storage 622, such as, a hard disk. The processor 61 exchanges data with the external storage 622 through the memory 621.

The specific execution process of the above instructions may refer to the steps of the method of interaction control described in the embodiments of the present disclosure, and thus will not be repeated here.

The embodiments of the present disclosure also provide a computer-readable storage medium having a computer program stored thereon. The computer program, when executed by a processor, carries out the steps of the method of interaction control described in the above method embodiment. The storage medium may be a volatile or non-volatile computer readable storage medium.

The embodiments of the present disclosure also provide a computer program product that carries program codes, which include instructions that may be used to execute the steps of the method of interaction control described in the above method embodiment. For details, please refer to the above method embodiment, and thus will not be repeated here.

The above-mentioned computer program products may be specifically implemented through hardware, software, or a combination of them. In one optional embodiment, the computer program product is specifically embodied as a computer storage medium, while in another optional embodiment, the computer program product is specifically embodied as a software product, such as a Software Development Kit (SDK), etc.

Those skilled in the art may clearly understand that for the convenience and conciseness of the description, the specific working process of the system and device described above may refer to the corresponding processes in the aforementioned method embodiments, and thus will not be repeated here. In the several embodiments provided in this disclosure, it should be understood that the disclosed systems, devices, and methods may be implemented in other ways. The device embodiments described above are only schematic. For example, the division of the units is only a logical functional division, and there may be other division methods in actual embodiment. For example, the plurality of units or components may be combined or integrated into another system, or some features may be ignored or not executed. On the other hand, the coupling or direct coupling or communication connection displayed or discussed between each other may be indirect coupling or communication connection through some communication interfaces, devices or units, which may be in the form of electrical, mechanical or other forms.

The units described as separate components may be or may not be physically separated, and the components displayed as units may be or may not be physical units, that is, they may be located in one place or distributed across the plurality of network units. Some or all of the units may be selected according to actual needs to achieve the purpose of this embodiment.

In addition, in various embodiments of the present disclosure, each functional unit may be integrated into a single processing unit, each unit may physically exist separately, or two or more units may be integrated into one unit.

If the function is implemented in the form of a software functional unit and sold or used as an independent product, it may be stored in a non-volatile computer readable storage medium that may be executed by a processor. Based on this understanding, the disclosed technical solution, in essence, or the portion that contributes to the existing technology or the portion of the technical solution, may be reflected in the form of a software product, which is stored in a storage medium, Including several instructions to enable a computer device (which may be a personal computer, server, or network device, etc.) to perform all or part of the steps of the methods described in various embodiments of the present disclosure. The aforementioned storage media may include: USB flash disk, Portable storage device, read only memory (ROM), Random-access memory (RAM), disk or optical disc and other media that may store Stored procedure codes. Finally, it should be noted that the above embodiments are only specific embodiments of the present disclosure, intended to illustrate the technical solution disclosed, rather than limiting it. The scope of protection of the present disclosure is not limited to this. Although detailed explanations of the present disclosure have been provided by referring to the aforementioned embodiments, ordinary technical personnel in the art should understand that any person familiar with the technical field within the scope of the disclosed technology, It may still modify the technical solution recorded in the aforementioned embodiments or easily think of changes, or equivalently replace some of the technical features; And these modifications, changes, or substitutions do not separate the essence of the corresponding technical solution from the spirit and scope of the embodiments of the present disclosure technical solution, and should be covered within the scope of protection of this disclosure. Therefore, the scope of protection disclosed in this disclosure shall be based on the scope of protection claimed.

The invention claimed is:

1. A method of interaction control comprising:
   displaying a virtual scene and a skill control in a display interface of a terminal device, the virtual scene comprising a first virtual object and a second virtual object associated with the first virtual object;
   in response to a trigger operation of the skill control, determining a target position in the virtual scene for the second virtual object to move to;
   determining, based on a distance between the target position and the first virtual object in the virtual scene, a skill release area of a target skill corresponding to the skill control and skill effect information for a third virtual object that is located within the skill release area, wherein a size of the release area is positively correlated with the distance, and a size of an effect value indicated by the skill effect information is negatively correlated with the distance;
   in response to a release operation of the skill control, controlling the second virtual object to move from a first position in the virtual scene to the target position, and releasing the target skill based on the skill release area and the skill effect information; and
   based on a completion of the releasing of the target skill, controlling the second virtual object to move from the target position to a second position in the virtual scene.

2. The method according to claim 1, wherein in response to a trigger operation of the skill control, determining a target position in the virtual scene for the second virtual object to move to comprises:
   in response to a sliding operation of the skill control, determining a mapping position of the sliding operation in the virtual scene, wherein the mapping position changes as a sliding position of the sliding operation changes; and
   determining the target position in the virtual scene for the second virtual object to move to based on the mapping position.

3. The method according to claim 1, wherein determining, based on a distance between the target position and the first virtual object in the virtual scene, a skill release area of a target skill corresponding to the skill control and skill effect information for a third virtual object that is located within the skill release area comprises:

determining, based on the distance between the target position and the first virtual object in the virtual scene, skill release areas respectively corresponding to the target skill corresponding to the skill control in a plurality of skill release stages and skill effect information for the third virtual object located within the corresponding skill release areas in the plurality of skill release stages.

4. The method according to claim 3, wherein determining, based on the distance between the target position and the first virtual object in the virtual scene, skill release areas respectively corresponding to the target skill corresponding to the skill control in a plurality of skill release stages comprises:

determining the skill release area corresponding to an initial skill release stage of the target skill in the plurality of skill release stages based on the distance between the target position and the first virtual object in the virtual scene; and determining the skill release area corresponding to other skill release stages of the target skill based on correspondence among the plurality of skill release stages.

5. The method according to claim 4, wherein determining the skill release area corresponding to other skill release stages of the target skill based on correspondence among the plurality of skill release stages comprises:

determining a size of the skill release area corresponding to the other skill release stages of the target skill based on the correspondence among the plurality of skill release stages;

determining an anchor position of the skill release area corresponding to the other skill release stages of the target skill; and determining the skill release area corresponding to the other skill release stages based on the size of the skill release area corresponding to the other skill release stages and the anchor position.

6. The method according to claim 1, wherein releasing the target skill based on the skill release area and the skill effect information further comprises:

controlling a movement of the third virtual object in the virtual scene based on the skill release areas respectively corresponding to a plurality of skill release stages, so that the third virtual object is located within the corresponding skill release areas during the plurality of skill release stages.

7. The method according to claim 1, wherein the skill effect information comprises: the number of damages caused by the target skill to the third virtual object, and a damage value of each of the damages.

8. The method according to claim 1, wherein durations corresponding to a plurality of skill release stages decrease in an order of the plurality of skill release stages.

9. A computer device comprising a processor and a memory, the memory storing machine-readable instructions executable by the processor, the processor configured to execute the machine-readable instructions stored in the memory, wherein when the machine-readable instructions are executed by the processor, the processor carries out the steps of the method of interaction control comprising:

displaying a virtual scene and a skill control in a display interface of a terminal device, the virtual scene comprising a first virtual object and a second virtual object associated with the first virtual object;

in response to a trigger operation of the skill control, determining a target position in the virtual scene for the second virtual object to move to;

determining, based on a distance between the target position and the first virtual object in the virtual scene, a skill release area of a target skill corresponding to the skill control and skill effect information for a third virtual object that is located within the skill release area, wherein a size of the release area is positively correlated with the distance, and a size of an effect value indicated by the skill effect information is negatively correlated with the distance;

in response to a release operation of the skill control, controlling the second virtual object to move from a first position in the virtual scene to the target position, and releasing the target skill based on the skill release area and the skill effect information; and based on a completion of the releasing of the target skill, controlling the second virtual object to move from the target position to a second position in the virtual scene.

10. The computer device according to claim 9, wherein the step of in response to a trigger operation of the skill control, determining a target position in the virtual scene for the second virtual object to move to comprises:

in response to a sliding operation of the skill control, determining a mapping position of the sliding operation in the virtual scene, wherein the mapping position changes as a sliding position of the sliding operation changes; and determining the target position in the virtual scene for the second virtual object to move to based on the mapping position.

11. The computer device according to claim 9, wherein the step of determining, based on a distance between the target position and the first virtual object in the virtual scene, a skill release area of a target skill corresponding to the skill control and skill effect information for a third virtual object that is located within the skill release area comprises:

determining, based on the distance between the target position and the first virtual object in the virtual scene, skill release areas respectively corresponding to the target skill corresponding to the skill control in a plurality of skill release stages and skill effect information for the third virtual object located within the corresponding skill release areas in the plurality of skill release stages.

12. The computer device according to claim 11, wherein the step of determining, based on the distance between the target position and the first virtual object in the virtual scene, skill release areas respectively corresponding to the target skill corresponding to the skill control in a plurality of skill release stages comprises:

determining the skill release area corresponding to an initial skill release stage of the target skill in the plurality of skill release stages based on the distance between the target position and the first virtual object in the virtual scene; and determining the skill release area corresponding to other skill release stages of the target skill based on correspondence among the plurality of skill release stages.

13. The computer device according to claim 12, wherein the step of determining the skill release area corresponding to other skill release stages of the target skill based on correspondence among the plurality of skill release stages comprises:

determining a size of the skill release area corresponding to the other skill release stages of the target skill based on the correspondence among the plurality of skill release stages;

determining an anchor position of the skill release area corresponding to the other skill release stages of the target skill; and determining the skill release area corresponding to the other skill release stages based on the size of the skill release area corresponding to the other skill release stages and the anchor position.

14. The computer device according to claim 9, wherein the step of releasing the target skill based on the skill release area and the skill effect information further comprises:

controlling a movement of the third virtual object in the virtual scene based on the skill release areas respectively corresponding to a plurality of skill release stages, so that the third virtual object is located within the corresponding skill release areas during the plurality of skill release stages.

15. The computer device according to claim 9, wherein the skill effect information comprises: the number of damages caused by the target skill to the third virtual object, and a damage value of each of the damages.

16. The computer device according to claim 9, wherein durations corresponding to a plurality of skill release stages decrease in an order of the plurality of skill release stages.

17. A non-transitory computer-readable storage medium having a computer program stored thereon, when the computer program being executed by a computer device, the computer device carrying out the steps of the method of interaction control comprising:

displaying a virtual scene and a skill control in a display interface of a terminal device, the virtual scene comprising a first virtual object and a second virtual object associated with the first virtual object;

in response to a trigger operation of the skill control, determining a target position in the virtual scene for the second virtual object to move to;

determining, based on a distance between the target position and the first virtual object in the virtual scene, a skill release area of a target skill corresponding to the skill control and skill effect information for a third virtual object that is located within the skill release area, wherein a size of the release area is positively correlated with the distance, and a size of an effect value indicated by the skill effect information is negatively correlated with the distance;

in response to a release operation of the skill control, controlling the second virtual object to move from a first position in the virtual scene to the target position, and releasing the target skill based on the skill release area and the skill effect information; and based on a completion of the releasing of the target skill, controlling the second virtual object to move from the target position to a second position in the virtual scene.

18. The non-transitory computer-readable storage medium according to claim 17, wherein the step of in response to a trigger operation of the skill control, determining a target position in the virtual scene for the second virtual object to move to comprises:

in response to a sliding operation of the skill control, determining a mapping position of the sliding operation in the virtual scene, wherein the mapping position changes as a sliding position of the sliding operation changes; and determining the target position in the virtual scene for the second virtual object to move to based on the mapping position.

19. The non-transitory computer-readable storage medium according to claim 17, wherein the step of determining, based on a distance between the target position and the first virtual object in the virtual scene, a skill release area of a target skill corresponding to the skill control and skill effect information for a third virtual object that is located within the skill release area comprises:

determining, based on the distance between the target position and the first virtual object in the virtual scene, skill release areas respectively corresponding to the target skill corresponding to the skill control in a plurality of skill release stages and skill effect information for the third virtual object located within the corresponding skill release areas in the plurality of skill release stages.

20. The non-transitory computer-readable storage medium according to claim 19, wherein the step of determining, based on the distance between the target position and the first virtual object in the virtual scene, skill release areas respectively corresponding to the target skill corresponding to the skill control in a plurality of skill release stages comprises:

determining the skill release area corresponding to an initial skill release stage of the target skill in the plurality of skill release stages based on the distance between the target position and the first virtual object in the virtual scene; and determining the skill release area corresponding to other skill release stages of the target skill based on correspondence among the plurality of skill release stages.

* * * * *